(12) United States Patent  
Lavoie et al.

(10) Patent No.: US 8,090,503 B2
(45) Date of Patent: Jan. 3, 2012

(54) METHOD FOR DETERMINING ABSOLUTE STEERING WHEEL ANGLE FROM A SINGLE-TURN STEERING WHEEL ANGLE SENSOR

(75) Inventors: Erick Michael Lavoie, Dearborn, MI (US); Darrel Recker, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 903 days.

(21) Appl. No.: 12/120,445

(22) Filed: May 14, 2008

(65) Prior Publication Data

US 2009/0287375 A1    Nov. 19, 2009

(51) Int. Cl.
*B62D 6/00* (2006.01)
(52) U.S. Cl. .......................................... 701/42; 180/6.2
(58) Field of Classification Search .............. 701/41, 701/42; 180/6.2, 7.1; 340/426.31; 477/1
See application file for complete search history.

(56) References Cited

U.S. PATENT DOCUMENTS

| | | | |
|---|---|---|---|
| 5,065,324 A | 11/1991 | Oshita et al. | |
| 5,787,375 A * | 7/1998 | Madau et al. | 701/41 |
| 5,790,966 A * | 8/1998 | Madau et al. | 701/41 |
| 6,122,568 A | 9/2000 | Madau et al. | |
| 6,141,605 A | 10/2000 | Joyce | |
| 6,466,848 B2 | 10/2002 | Ozaki et al. | |
| 6,554,095 B2 | 4/2003 | Zheng et al. | |
| 6,598,699 B2 | 7/2003 | Takehara et al. | |
| 6,654,674 B2 * | 11/2003 | Lu et al. | 701/36 |
| 6,661,191 B2 | 12/2003 | Zheng et al. | |
| 6,775,604 B2 | 8/2004 | Dilger | |
| 6,789,017 B2 * | 9/2004 | Aanen et al. | 701/41 |
| 6,865,462 B2 | 3/2005 | Yao et al. | |
| 6,928,352 B2 | 8/2005 | Yao et al. | |
| 6,968,262 B2 | 11/2005 | Higashi et al. | |
| 7,100,733 B2 | 9/2006 | Zhao | |
| 7,966,113 B2 * | 6/2011 | Kroehnert et al. | 701/41 |

\* cited by examiner

*Primary Examiner* — Drew Brown
(74) *Attorney, Agent, or Firm* — Angela M. Brunetti; Fredrick Owens

(57) ABSTRACT

A method and algorithm for determining a steering wheel angle of a vehicle steering mechanism upon power up of a vehicle using a single-turn steering wheel angle sensor by eliminating plausible steering wheel angles until one and only one steering wheel angle possibility remains.

31 Claims, 9 Drawing Sheets

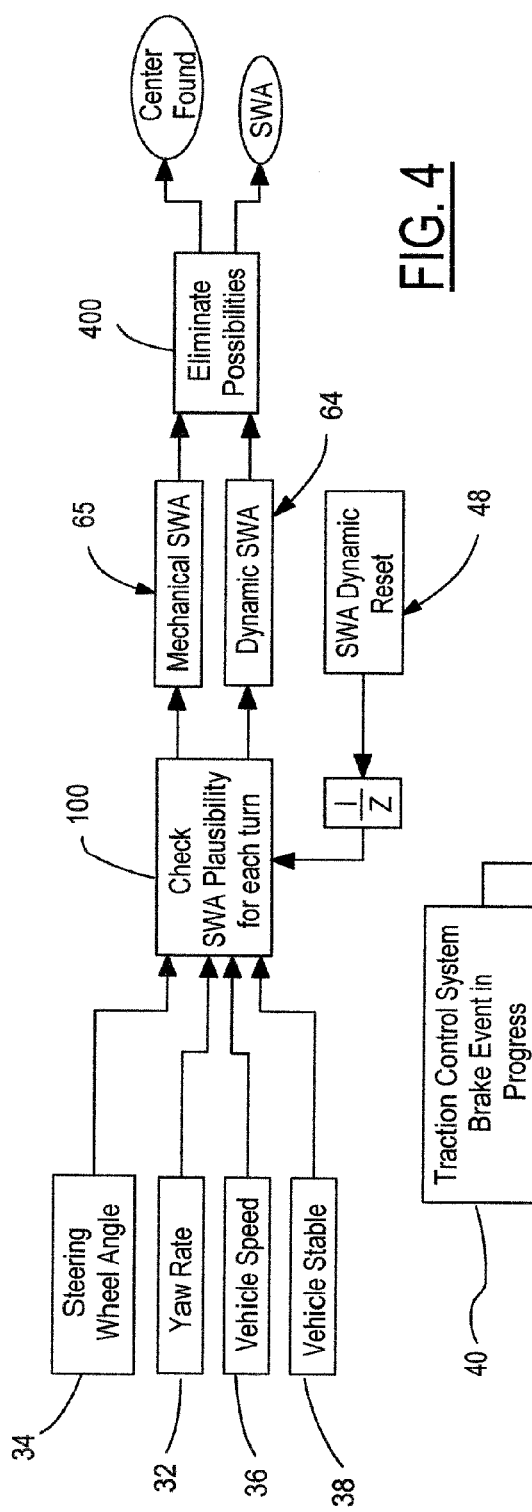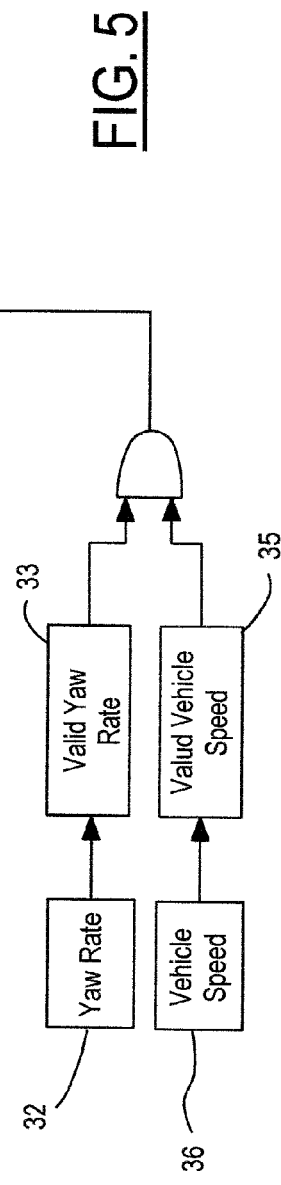
FIG. 4
FIG. 5

METHOD FOR DETERMINING ABSOLUTE STEERING WHEEL ANGLE FROM A SINGLE-TURN STEERING WHEEL ANGLE SENSOR

TECHNICAL FIELD

The inventive subject matter relates to a method for determining absolute steering wheel angle from a single-turn absolute steering wheel angle sensor.

BACKGROUND

Vehicle control systems enhance vehicle stability and tracking performance in critical dynamic situations. Examples include yaw stability, roll stability and integrated vehicle dynamic control systems. Typically the vehicle control systems utilize information from a plurality of sensors on the vehicle. One such sensor is a steering wheel angle sensor. Steering wheel angle sensors range from low cost, i.e., a single-turn steering wheel angle sensor, to more reliable and more expensive sensors, i.e., multi-turn absolute steering wheel angle sensors.

An example of a control system on a vehicle that may utilize a steering wheel angle sensor is an automatic parallel parking feature. This feature requires a reliable steering wheel angle soon after the vehicle is powered up, hereinafter, key-on. Determination of a reliable steering wheel angle may be accomplished using a multi-turn absolute steering wheel sensor, but has the drawback of being an expensive sensor.

There is a need for a system and method of obtaining an absolute steering wheel angle quickly after key-on using a single turn absolute sensor, or similar low-cost sensor.

SUMMARY OF THE INVENTION

A method of determining a steering wheel angle of a vehicle steering mechanism, upon key-on of a vehicle, using a single-turn steering wheel angle sensor, the method comprising the steps of sensing a steering wheel angle from a single-turn steering wheel angle sensor, storing plausible absolute steering wheel angle positions formed from the sensed steering wheel angle, sensing an output from a selected vehicle sensor that is input to a control system of the vehicle; calculating an expected output of the selected vehicle sensor for the plausible steering wheel angle positions; and outputting a single absolute steering wheel angle from the plausible absolute steering wheel angle positions based on a comparison of the sensed output for the sensed steering wheel angle against the calculated expected output of the vehicle sensor for a plausible absolute steering wheel angle position.

A control module algorithm for determining a steering wheel angle of a vehicle steering mechanism, upon power-up of a vehicle, using a single-turn steering wheel angle sensor, comprising a steering wheel angle input to the control module from the single-turn steering wheel angle sensor, a vehicle sensor input to the control module, a vehicle speed input to the control module, a vehicle stability check input to the control module, a steering wheel angle lock input, one or more plausible steering wheel angles at key-on, a calculated sensor value for each plausible steering wheel angle in the one or more plausible steering wheel angles, a threshold check of plausible steering wheel angles to the steering wheel angle lock input, a threshold check of the calculated sensor value for each plausible steering wheel angle to the measured sensor value, one and only one plausible steering wheel angle output as a result of eliminating plausible steering wheel angles that exceed the threshold checks.

A method of determining a steering wheel angle of a vehicle steering mechanism, upon power-up of a vehicle, using a single-turn steering wheel angle sensor, the method comprising the steps of determining plausible absolute steering wheel angle positions adding offsets of ±n times a predetermined angle to a steering wheel angle provided from the single-turn steering wheel angle sensor, eliminating possibilities of the plausible absolute steering wheel angle positions through a comparison of each of the plausible steering wheel angle positions to predetermined maximum and minimum steering wheel angle threshold values, whereby each plausible absolute steering wheel angle position that exceeds either the maximum or minimum steering wheel angle threshold value is eliminated, determining a vehicle stability check through the identification of at least one item of non-forward motion of the vehicle, a brake event in a traction control system, an engine event in a traction control system or an electronic stability program event, preventing the determination of a steering wheel angle of a vehicle steering mechanism upon any one of the vehicle stability check items being identified, calculating a yaw rate for each of the plausible absolute steering wheel angle positions, the calculated yaw rate being a product of a predetermined yaw rate error, a vehicle speed input and the plausible absolute steering wheel angle, eliminating possibilities of the plausible steering wheel angle positions through a comparison of a difference between the calculated yaw rate and the vehicle yaw rate, whereby each difference that exceeds either a maximum or minimum threshold value is eliminated, and providing a steering wheel angle output from the elimination of all but one possibility from the plausible offset steering wheel angle positions.

Other advantages and features of the inventive subject matter will become apparent when viewed in light of the detailed description of the preferred embodiment when taken in conjunction with the attached drawings and appended claims.

BRIEF DESCRIPTION OF THE DRAWINGS

FIG. 4 is a broad flow diagram of the inventive subject matter;

FIG. 5 is a logic diagram of a vehicle stability check module used in accordance with the inventive subject matter;

DETAILED DESCRIPTION

Figure 1:
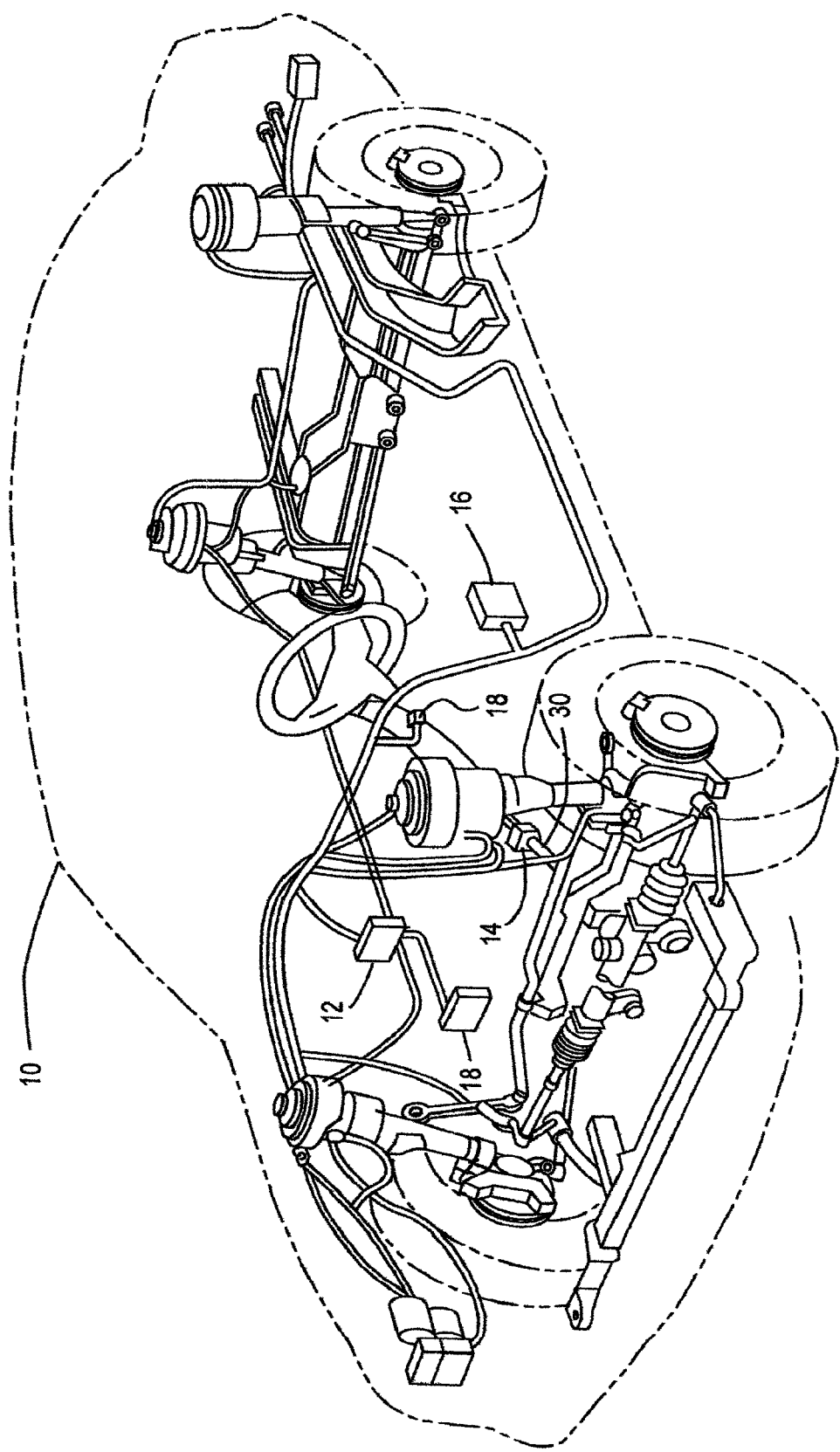
FIG. 1 is an automotive vehicle that benefits from the inventive subject matter.

In the following figures, the same reference numerals will be used to identify the same components. The inventive subject matter will be discussed below in terms of preferred embodiments relating to an automotive vehicle. However, it should be noted that the method of the inventive subject matter may be applied to another vehicle having a steering mechanism, a single-turn absolute steering wheel sensor, and a yaw rate sensor.

Referring to FIG. 1, an automotive vehicle 10 is shown. A control module 12 receives inputs from a single-turn steering wheel angle sensor 14, a yaw rate sensor 16, and a speed sensor 18. It should be noted that the yaw rate sensor 16 and the speed sensor 18 may comprise any of a variety of devices or systems employed in automotive vehicles. For example, one type of yaw rate sensor as is used in stability control, or any other set of sensors that may be used to calculate vehicle yaw rate. Likewise, one type of automotive speed sensor may be a speed module for receiving input from multiple speed sensors adapted to indicate the speed of individual wheels.

Figure 2:
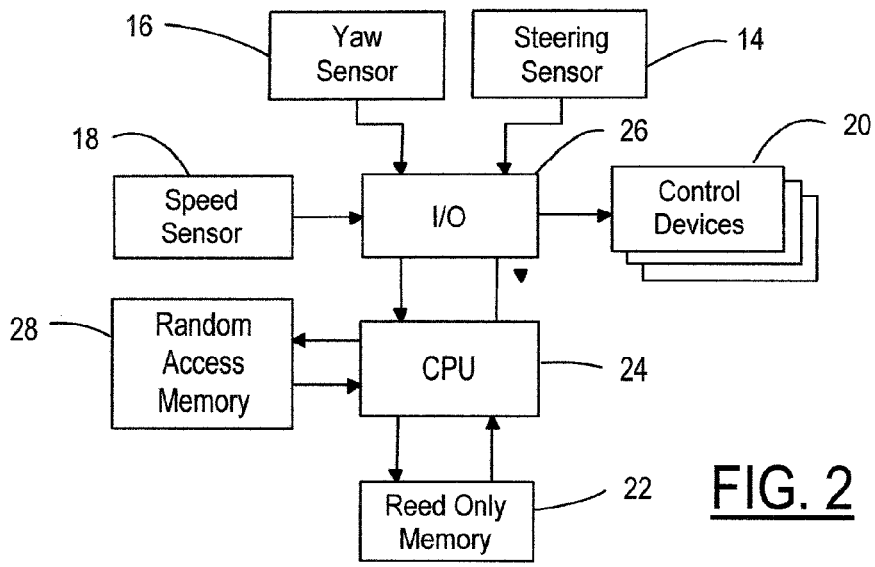
FIG. 2 is a control module that is part of the automotive vehicle, in communication with various systems on the automotive vehicle, and used to implement the inventive subject matter.

The control module 12, as shown in FIG. 2, controls many devices 20 on the vehicle, and typically contains a processor therein configured so that control programs are stored in read-only memory (ROM) 22. Commands are executed by a central processing unit (CPU) 24. The CPU includes input-output control circuit (I/O) 26 for exchanging data with external devices and a random access memory (RAM) 28 for temporarily holding data while the data are being processed.

Referring again to FIG. 1, the steering wheel angle sensor 14, acting in conjunction with the control module 12, includes means for measuring an excursion angle of the steering mechanism as a series of marker counts or steps measured from the initial position which the steering mechanism occupied when the system was activated by an operator keying on an ignition of the vehicle. The steering wheel angle sensor 14 provides a signal a predetermined number of times during one revolution of the steering wheel resulting in a count, or step for each predetermined degree of rotation of the steering wheel. These counts are used to determine an estimate of the steering wheel position upon key-on corresponding to a finite amount of rotation of a steering shaft 30 relative to the initial position of the steering wheel at key-on. The counts are used to estimate the center position of the steering wheel and a corresponding estimate of the actual steering angle of the vehicle.

Generally, the inventive subject matter provides an improvement in the determination of the actual steering angle at key-on from raw steering data obtained from the steering wheel angle sensor 14. It should be noted that the difference between the measured steering wheel data and the actual steering angle is the difference between the actual steering wheel angle at key-on and the steering wheel angle when traveling straight ahead (ideally, zero). Unfortunately, it cannot be guaranteed that a vehicle will always be started, or powered up, with the steering mechanism in the straight ahead position. Therefore, it becomes necessary to estimate the location of the center position and the true steering wheel angle.

Figure 3:
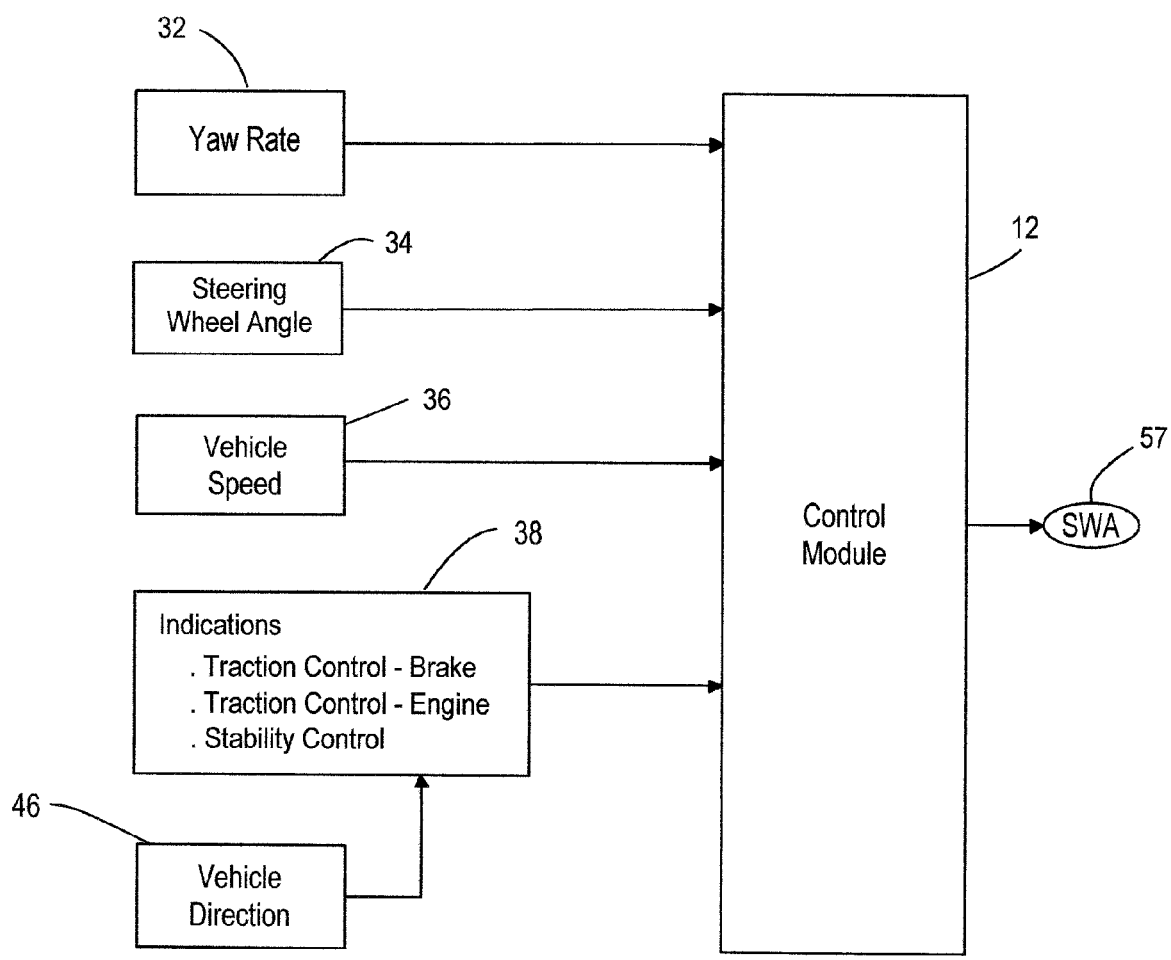
FIG. 3 is a diagram of inputs used by the control module according to the inventive subject matter to determine an absolute steering wheel angle from a single-turn absolute steering wheel angle sensor.

FIG. 3 is a diagram of inputs used by the control module according to the inventive subject matter. Inputs are signals from various sensors on the vehicle, including, but not limited to, a yaw rate 32, a steering wheel angle 34, and a vehicle speed 36. For example, other inputs may include longitudinal acceleration, roll angle and others.

In addition to the sensor inputs, the method performs a vehicle stability check 38. In the event the vehicle is being operated in an unstable state or under conditions that may not be conducive to applying the algorithm, the vehicle stability check 38 ensures the dynamic steering wheel angle algorithm will not be applied until the vehicle's operations are stable.

The vehicle stability check may use a signal 40 representative of the vehicle direction. The vehicle direction signal 46 may be a derived from wheel speed sensors (not shown) on the automotive vehicle. In another embodiment of the inventive subject matter, a hybrid electric motor can provide a motor speed signal from the hybrid system. The motor speed signal can then be used to derive the vehicle direction signal 46. The hybrid system does not need to incorporate wheel speed sensors for this purpose. However, wheel speed sensors may be used in conjunction with the motor speed signal in a hybrid system if so desired. In any event, the vehicle must be moving in a forward direction for a positive vehicle stability check 38.

The method of the present invention begins at key-on to determine a steering wheel angle from a single-turn steering wheel angle sensor. In a broad flow diagram of the inventive subject matter is shown in FIG. 4. The inputs 32, 34, 36, 38 are manipulated as necessary to determine 100 plausible steering wheel angles at key-on. The plausible steering wheel angles are determined 100 through dynamic means 64, by utilizing knowledge of the relationship between various sensors and signals on the vehicle, for example, yaw rate, vehicle speed and steering wheel angle, until all possibilities are eliminated 400 and one and only one possible steering wheel angle remains.

In another embodiment, the dynamic steering wheel angle determination of the inventive subject matter may be combined with other methods, such as utilizing knowledge of mechanical limits of the steering mechanism 65 and all possibilities are eliminated 400 until one and only one possible steering wheel angle remains.

In some applications, the dynamic SWA may be applied only in instances where the vehicle has been deemed stable. Hence, the inventive subject matter may perform a stability check 38. It should be noted that other methods may be relied upon so as to improve the robustness of the system.

FIG. 5 shows a logic diagram of the vehicle stability check 38 that may be performed before the dynamic SWA algorithm is applied. The vehicle stability check 38 may use the vehicle yaw rate 32 and the vehicle speed 36. A determination is made as to whether the yaw rate and vehicle speed signals are valid signals, 33, 35. An invalid signal or bad input, for example, may occur in the event of a sensor failure.

Inputs 40, 42, 44 are also provided from various vehicle control systems to indicate when an event is occurring within the particular vehicle control system that may warrant prevention of the algorithm being implemented. The traction control system can provide signals 40, 42 in the event a brake or engine control event is taking place. The stability control system may provide a signal 44 indicating an engine event is taking place. In the event any one of these events is taking place, the vehicle's operation will deemed unstable for applying the algorithm of the inventive subject matter.

Additionally, a vehicle direction signal 46 may be provided to the control module. The vehicle direction signal 46 may be a derived from wheel speed sensors (not shown) on the automotive vehicle. In another embodiment of the inventive subject matter, a hybrid electric motor can provide a motor speed signal from the hybrid system. The motor speed signal can then be used to derive the vehicle direction signal 46. The hybrid system does not need to incorporate wheel speed sensors for this purpose. However, wheel speed sensors may be used in conjunction with the motor speed signal in a hybrid system if so desired. In any event, the vehicle must be moving in a forward direction for a positive vehicle stability check 38.

In some applications, it may be desired that in the event conditions prove that the vehicle is operating in an unstable state, the dynamic SWA algorithm of the inventive subject matter will not be applied. In the event the conditions prove to be favorable. i.e., there are no control events occurring, the yaw rate and vehicle speed signals are valid, and the vehicle is moving in a forward direction, the vehicle's operation is stable, and a vehicle stable signal 38 enables the algorithm to check steering wheel angle plausibility for each turn to eliminate possibilities and end up with the one and only plausible turn, thereby identifying the steering wheel angle.

Referring back to FIG. 4, the algorithm checks steering wheel angle plausibility for each turn by generating plausibility data from the steering wheel angle signal 34, the vehicle yaw rate 32 the vehicle speed 36 and a reset steering wheel angle dynamic 48, to be discussed later herein.

In the example shown in FIG. 4, two types of steering wheel angle data are considered in the plausibility check 100; a mechanical steering wheel angle plausibility determination, hereinafter mechanical SWA 65, and a dynamic steering wheel angle plausibility determination, hereinafter dynamic SWA 64. Two types of steering wheel angle determinations are incorporated because they complement each other and allow for quicker elimination of possibilities of the steering wheel angle, leading, more quickly, to the determination of the one and only one plausible steering wheel angle at key-on.

However, it should be noted that the dynamic SWA 64 alone may be used to effectively determine the steering wheel angle. The addition of another method, such as the mechanical SWA 65, is an option that adds robustness to the results. However, it is not necessary for the inventive subject matter and the dynamic SWA method may be applied alone, or in conjunction with an alternative method. For example, a torque steering wheel angle plausibility determination may be combined with the dynamic SWA 64, or the dynamic SWA 64 and mechanical SWA 65 combined. While the example presented herein includes the dynamic SWA 64 in combination with the mechanical SWA 65, it is to be understood that the dynamic SWA 65 may stand alone, or be combined with one or more methods to increase robustness of a steering wheel angle determination.

Figure 6:
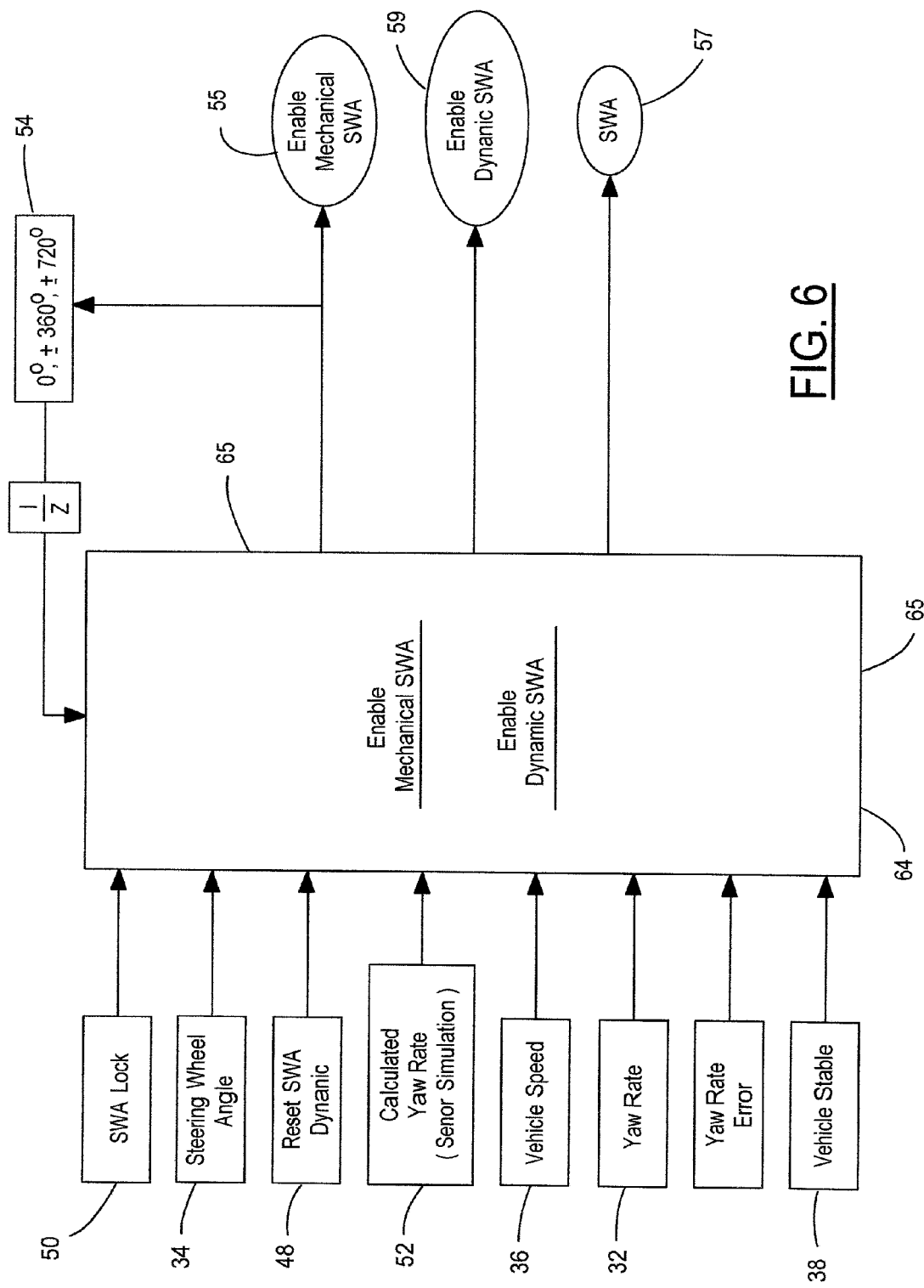
FIG. 6 is a high-level block diagram of the inventive subject matter.

Referring to FIG. 6, a broad representation of the inventive subject matter is shown in block diagram highlighting the inputs used in both the mechanical SWA and dynamic SWA plausibility determinations.

In both the mechanical SWA 64 and dynamic SWA portions of the method, as each plausible steering wheel angle is eliminated as a possibility, that angle is eliminated from consideration by setting an output to zero, and only the plausible steering wheel angles are used in the determination of steering wheel angle 57.

Figure 7:
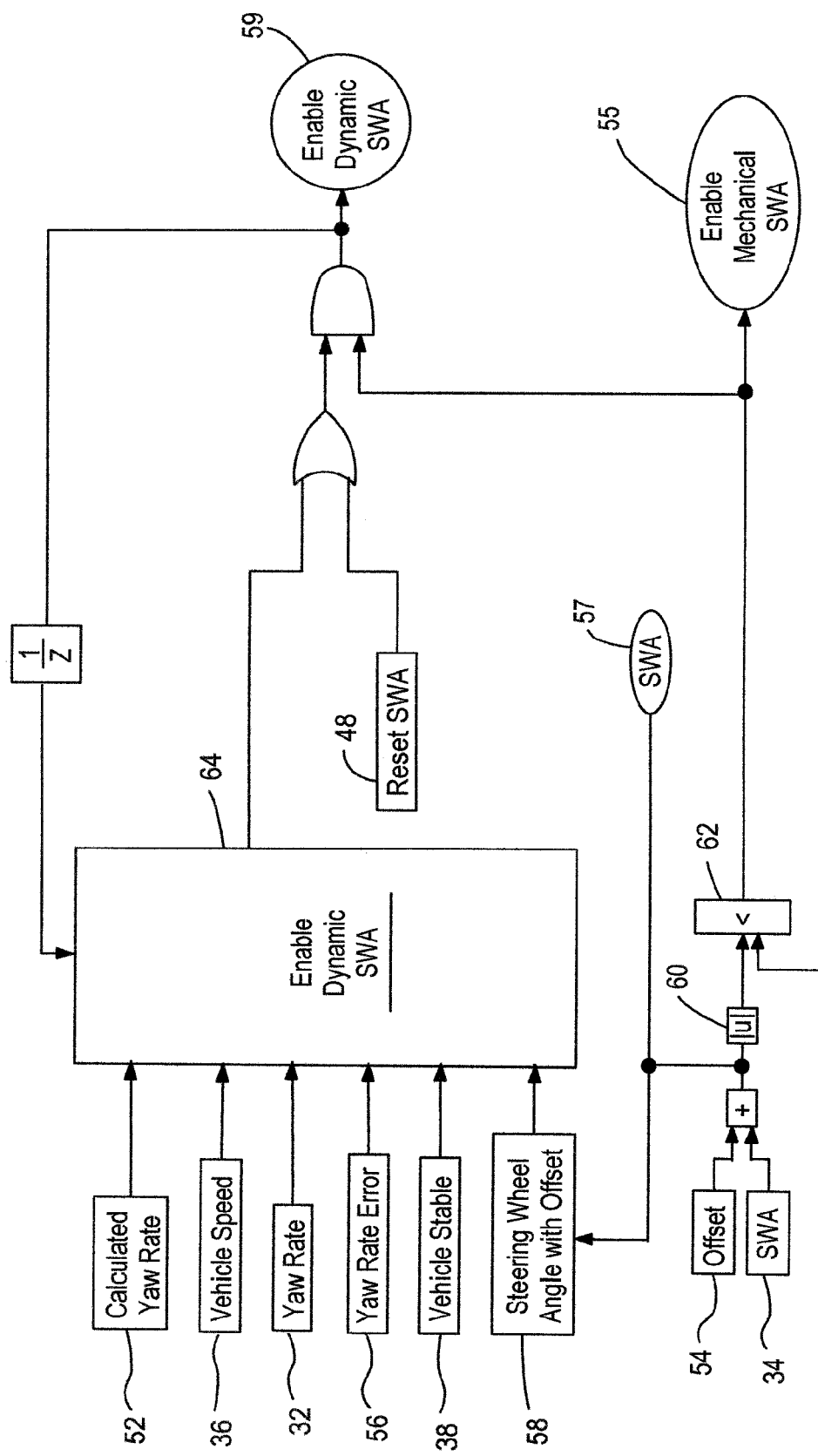
FIG. 7 is a more detailed block diagram showing a logic diagram for a portion of the inventive subject matter that enables a mechanical steering wheel angle plausibility determination.

FIG. 7 shows the logic of the inventive subject matter in more detail. The determination of plausible steering wheel angles using dynamic SWA is directed to the determination of a steering wheel angle from yaw rate calculations that will be discussed in detail with respect to FIG. 8. It should be noted that while the determination of steering wheel angle is being described herein in terms of yaw rate calculations, it is possible to substitute another vehicle signal, such as longitudinal acceleration or roll angle, to achieve results similar to those described in the example herein.

Referring still to FIG. 7, the steering wheel angle 34 from the sensor is offset by 0°, ±360°, and ±720°. Each of the offsets in the example are a factor of ±180°, i.e., n(180°), where n is a positive or negative integer value. The offsets 0°, ±360°, and ±720° correspond to n=0, n=±2, and n=±4.

The offset 54 is added to the raw data from the single-turn absolute steering wheel angle sensor, steering wheel angle 34. The offset steering wheel angle 58 is provided as an input to the dynamic SWA plausibility determination. An absolute value function 60 is applied to the offset steering wheel angle 58 to avoid negative angles when subtracting 360° or 720° from the raw data steering wheel angle 34.

A calculated yaw rate 52 is a tunable parameter used in the dynamic SWA portion as compared to the vehicle yaw rate 32. The calculated yaw rate 52 is predetermined from simulation data. For example, yaw rates are known, as by simulation, for a particular vehicle having a steering wheel sensor in a particular position, defining a yaw rate error 56 and thereby defining thresholds for comparison to the measured SWA at key-on.

Figure 8:
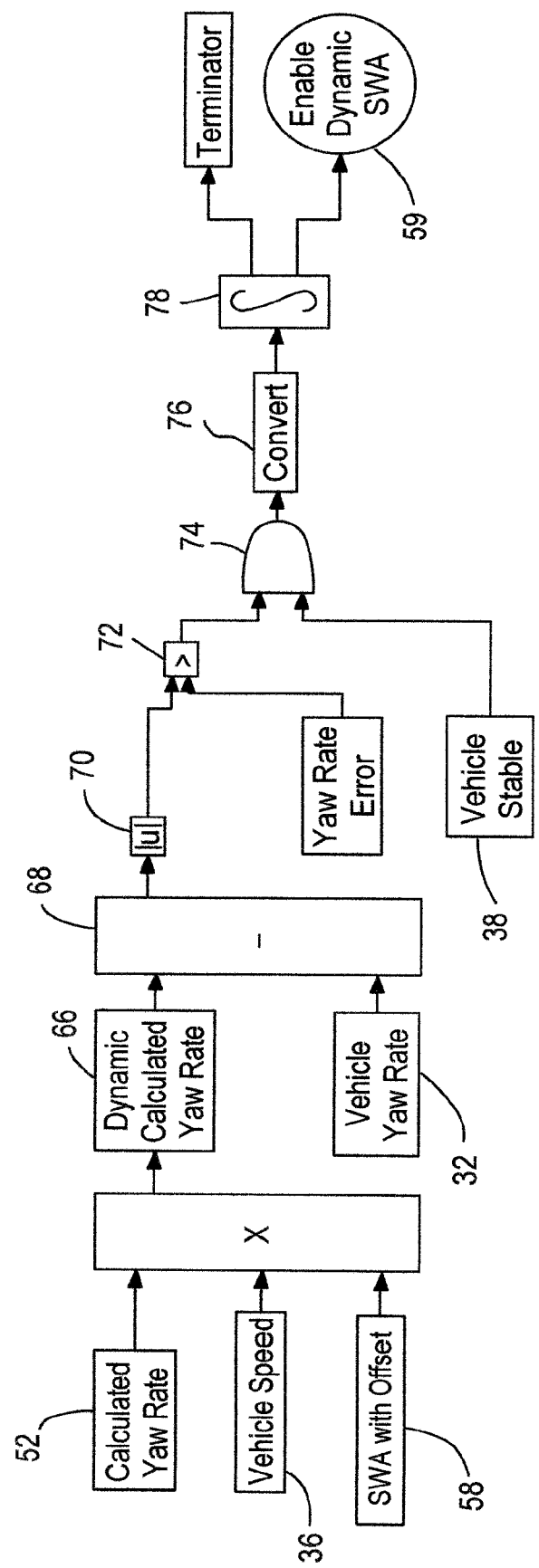
FIG. 8 is a more detailed logic diagram for a portion of the inventive subject matter that enables a dynamic steering wheel angle plausibility determination.

The offset steering wheel angle 58 is also provided as an input 58 to the dynamic steering wheel angle determination 64. FIG. 8 is a logic diagram of the dynamic SWA determination 64. The product of the calculated yaw rate 52, the vehicle speed 36 and the offset steering wheel angle 58 determines a dynamic calculated yaw rate 66 from the steering wheel sensor. As stated above, the calculated yaw rate 52 is a predetermined value determined through simulation and is dependent on multiple vehicle factors. Other vehicle data may also be used to determine the calculated yaw rate 54. For example, vehicle roll angle may also be used to calculate or estimate yaw rate.

The vehicle yaw rate 32, as from sensor 16, is subtracted 68 from the dynamic calculated yaw rate 66 and an absolute value function 70 is applied. A comparison 72 is performed between the difference of the calculated yaw rate 66 and the vehicle yaw rate, and the yaw rate error 56 (also described hereinbefore as a predetermined parameter). Once a threshold is exceeded, in that the calculated yaw rate diverts from the vehicle yaw rate by more than a predetermined amount, that particular offset angle may be eliminated as a possibility, bringing the method one step closer to the determination of the one and only one possibility for steering wheel angle.

Graphs of the dynamic SWA are shown in FIGS. 9A through 9E and are representative of the comparison between the calculated yaw rate and the sensor yaw rate to determine plausible steering wheel angles for steering wheel angle with offset when the calculated yaw 102 rate deviates from the sensor yaw rate 104 beyond predetermined threshold values 106, 108. In each of FIGS. 9A through 9E, 10A through 10E and 11A through 11B, graphs labeled A depict a +720° offset to the steering wheel angle, graphs labeled B depict a +360° offset, graphs labeled C depict no offset, graphs labeled D depict a −360° offset, and graphs labeled E show a −720° offset depiction. The y-axis represents the steering wheel angle and the x-axis represents time in seconds.

In graphs 9A-9E, at key-on, zero seconds, the yaw rate from the sensor output 102, and the calculated yaw rate 104 do not deviate from each other. The upper threshold 106 and lower threshold 108 are also shown. However, as time progresses, the calculated yaw rate 104 deviates drastically from the yaw rate from the sensor 102 as can be seen in FIGS. 9A, 9B, 9C and 9E. Therefore, these steering wheel angles can be eliminated as possibilities, and the dynamic SWA for these particular offsets are disabled, as shown in FIGS. 10A, 10B, 10C and 10E.

Figure 9:
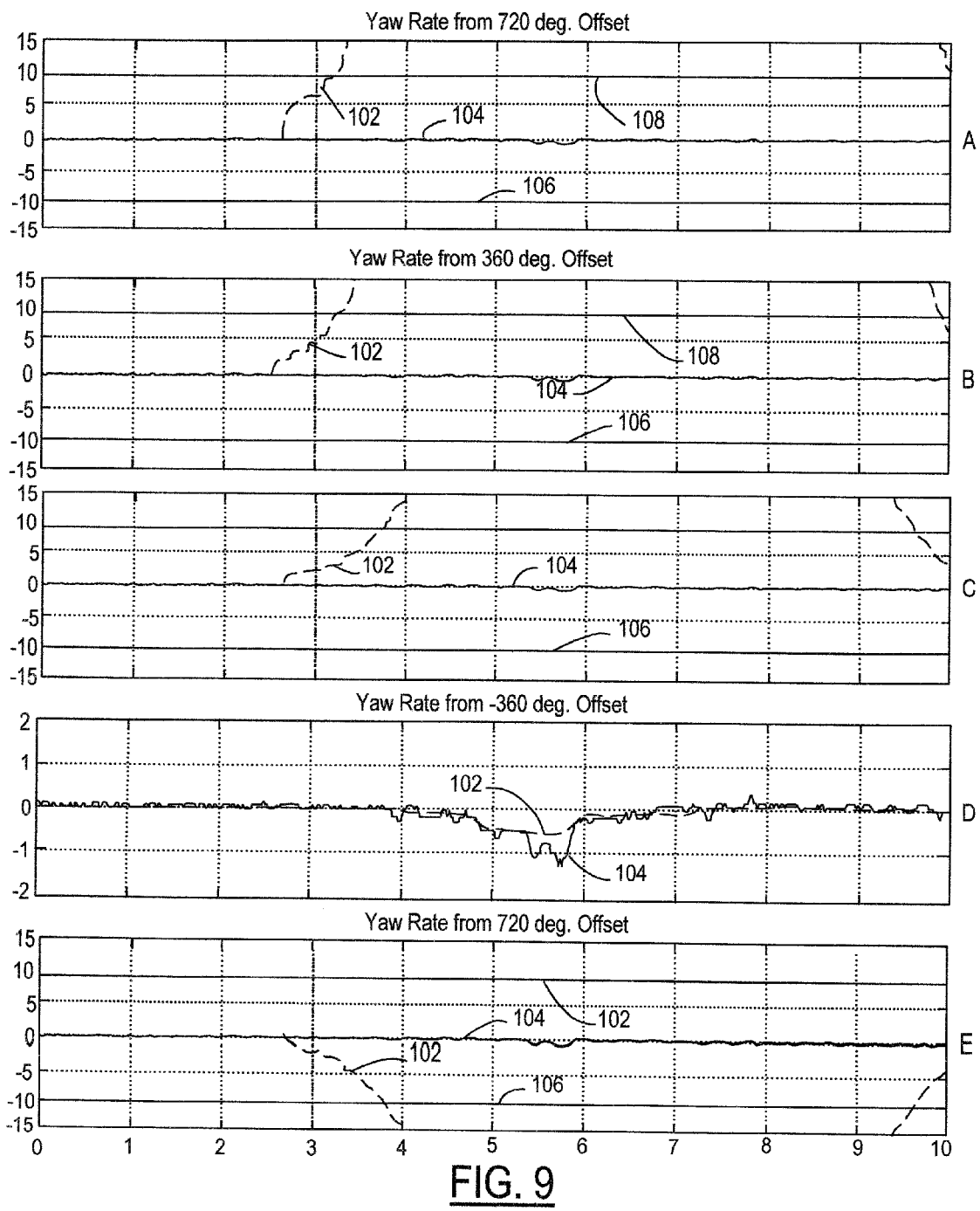
FIGS. 9A through 9E are a set of graphs representing the results of an application of the method of the inventive subject matter.
Figure 10:
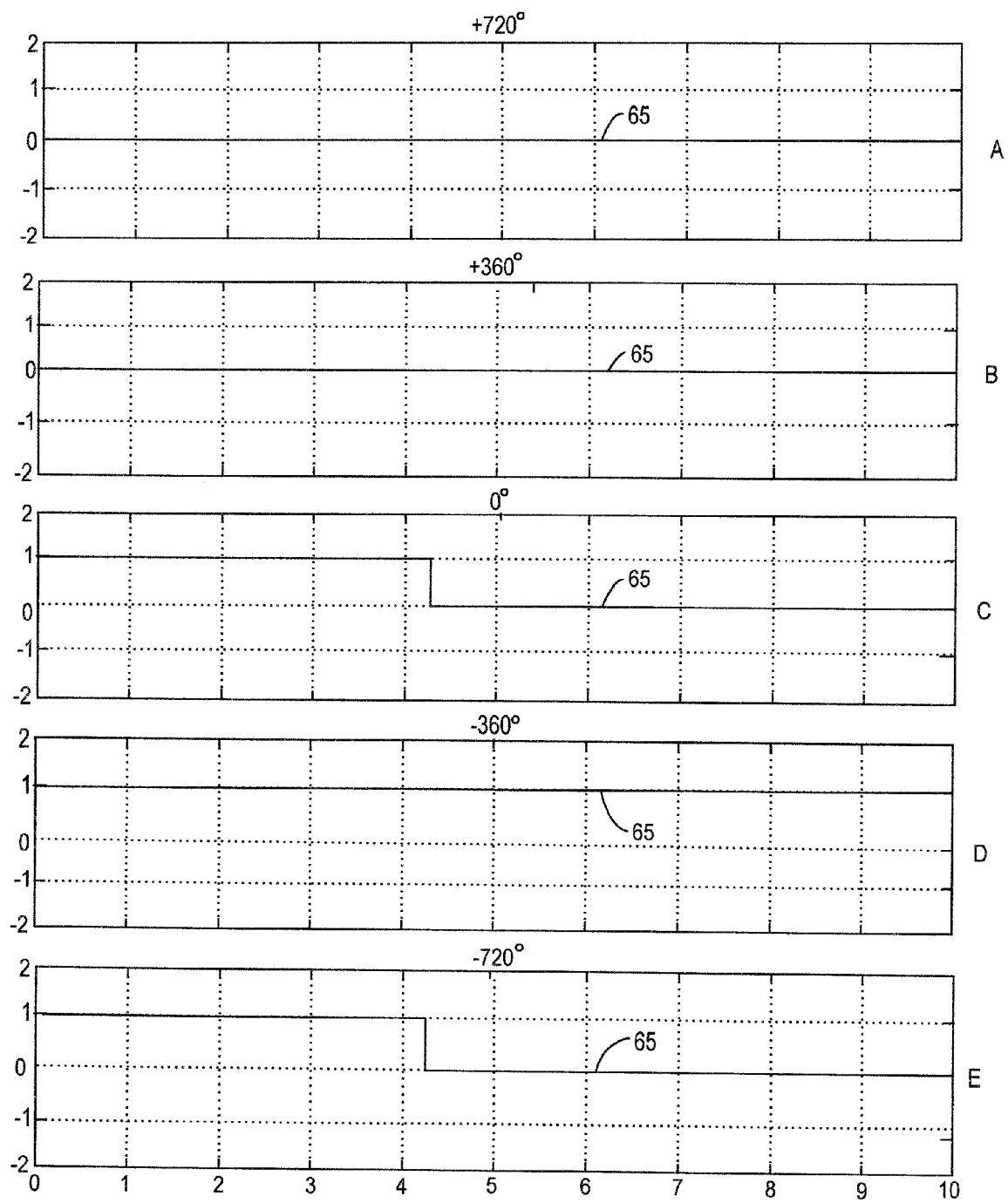
FIGS. 10A through 10E are the results of the elimination of plausible steering wheel angles using the dynamic steering wheel angle determination portion of the inventive subject matter.

FIG. 9D is different in that the calculated yaw rate 104 does not dramatically differ from the sensor yaw rate 102, and is therefore representative of the one and only one plausible angle, thereby confirming the SWA output as shown in FIG. 10D. FIGS. 10A and 10B show that the offset angle is not a plausible angle and therefore are set to zero. FIGS. 10C and 10E begin as plausible angles, thereby have values of 1, and then become eliminated as possibilities, thereby having values of 0. On the other hand, FIG. 10D remains a possibility, even after all other plausible angles have been eliminated, thereby deeming it to be the one and only one steering wheel angle.

The dynamic SWA determination of the inventive subject matter is combined with a mechanical SWA determination. As discussed hereinbefore, there is no requirement to combine the dynamic SWA method with a mechanical, or other, method. However, there are some advantages to the robustness of the system. A tunable parameter called steering wheel angle lock 50 is used in the mechanical SWA method. This tunable parameter is based on predetermined signals for steering wheel minimum and maximum travel. The value of this parameter is dependent on the make and model of a particular vehicle and the type of single-turn steering wheel angle sensor used on the vehicle. In some sensor technology, the single-turn is based on 0° to 360° and in other sensor technology, the turn is based on ±180°, or a factor of 180°. The inventive subject matter is applicable to either sensor type. The steering wheel angle (SWA) lock 50 is predetermined and is used for purposes of the mechanical SWA determination. The SWA lock is a threshold level based on minimum and maximum sensor signals known to represent steering wheel angle mechanical lock-to-lock rotations.

The mechanical travel of the steering wheel is easily ascertained by the physical mechanical travel of the steering wheel. However, when a single-turn steering wheel angle sensor is used, the determination of a steering wheel angle is complicated in that, similar to a clock that fails to indicate AM or PM, the steering wheel angle sensor fails to indicate the number of wrapped roll-overs of the steering wheel angle that may have occurred. Therefore, the determination of possible absolute steering wheel angle positions, in the mechanical sense, needs to include enabling mechanical steering wheel angle for ±360 degrees (one turn of the steering wheel in a positive and a negative direction) and ±720 degrees (two turns of the steering wheel in a positive and a negative direction). The offset is used to eliminate possibilities for steering wheel angle.

The mechanical portion performs a threshold check of the measured steering wheel angle 34 from the sensor in comparison to known signals for predetermined minimum and maximum travel of the steering wheel mechanism. Concurrently, the inventive subject matter of the dynamic steering wheel angle determination (dynamic SWA) is provided. The example herein is accomplished by a yaw rate method, but a method utilizing another vehicle dynamic other than yaw rate, may also be used to determine dynamic SWA without departing from the scope of the present invention. For example, roll angle is another variable that may be used to calculate a yaw rate to determine SWA according to the inventive subject matter.

A comparison 62 of the absolute steering wheel angle, including offset if applied, is performed with the steering wheel angle lock 50 for the mechanical SWA plausibility determination. The SWA lock thresholds are predetermined as described above. In the event the steering wheel angle lock signal is greater than the absolute SWA lock maximum threshold or less than the SWA lock minimum threshold, those possibilities are either eliminated or remain plausible and the mechanical steering wheel angle is either enabled 55, in which case it continues to run through possibilities, or it is disabled, meaning the one and only one steering wheel angle has been determined.

FIGS. 12A through 12E are a comparison of the mechanical SWA 64 and the dynamic SWA 65 results and are displayed herein to show that the mechanical method alone takes much more time to come to the determination that the dynamic SWA method accomplished. For example, FIGS. 12A and 12B show that for an offset of 720° neither the mechanical SWA nor the dynamic SWA plausibility determinations consider this angle to be plausible. FIGS. 12C, 12D and 12E, for mechanical SWA 64 determine these angles to all be possibilities.

Figure 11:
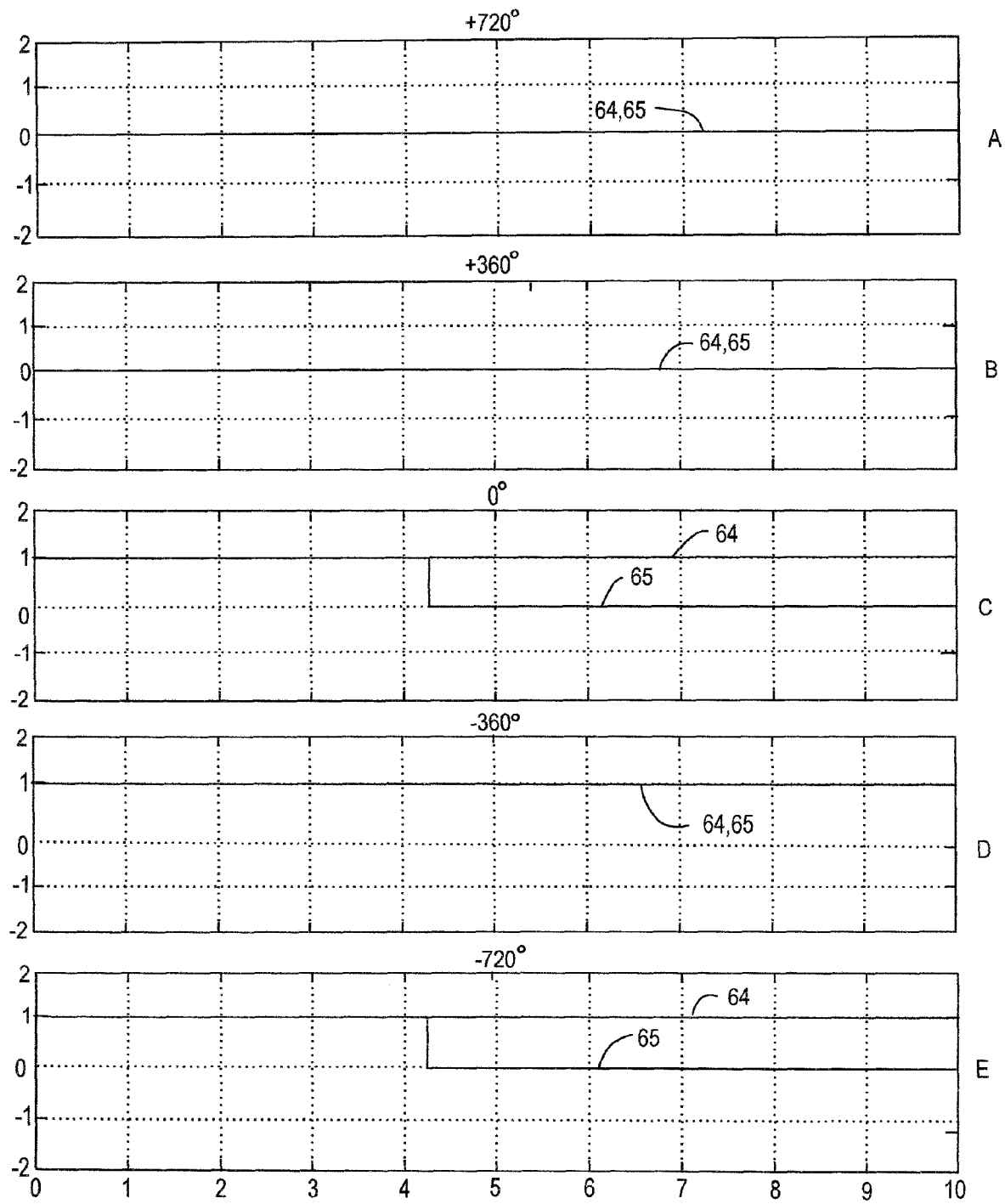
FIGS. 11A through 11E are a comparison of the results of the plausible steering wheel angles using mechanical determination and the dynamic steering wheel angle determination.

The advantage to employing the dynamic SWA yaw rate method of the inventive subject matter becomes obvious after about 4.25 seconds, when the dynamic SWA 65 eliminates 0° and −720° offset angles as possibilities, while mechanical SWA 64 has not yet been able to make that determination. The one and only one plausible steering wheel angle becomes obvious and is shown in FIG. 11D.

According to the inventive subject matter, both plausibility determinations are run at key-up, and as each possibility is eliminated, that portion is disabled, until the one and only one plausible steering wheel angle is determined and output as steering wheel angle 55.

While particular embodiments of the invention have been shown and described, numerous variations and alternate embodiments will occur to those skilled in the art. Accordingly, it is intended that the invention be limited only in terms of the appended claims.

What is claimed is:

1. A method of determining a steering wheel angle of a vehicle steering mechanism, upon key-on of a vehicle, using a single-turn steering wheel angle sensor, the method comprising the steps of:
    sensing a steering wheel angle from the single-turn steering wheel angle sensor;
    storing plausible absolute steering wheel angle positions formed from the sensed steering wheel angle;
    sensing an output from a selected vehicle sensor that is input to a control system on the vehicle;
    calculating an expected output of the selected vehicle sensor for the plausible steering wheel angle positions; and
    outputting a single absolute steering wheel angle from the plausible steering wheel angle positions based on a comparison of the sensed output for the selected vehicle sensor for the sensed steering wheel angle against the calculated expected output of the vehicle sensor for a plausible absolute steering wheel angle position.

2. The method as claimed in claim 1 wherein the step of storing plausible absolute steering wheel angle positions further comprises the step of adding a predetermined offset angle to a measured steering wheel angle from the single-turn steering wheel angle sensor.

3. The method as claimed in claim 2 wherein the step of adding a predetermined offset angle further comprises a predetermined offset angle that is a factor, n, of a predetermined angle.

4. The method as claimed in claim 2 wherein the step of outputting a single absolute steering wheel angle position further comprises comparing a calculated steering wheel angle estimate for each predetermined offset angle to a measured vehicle steering angle, wherein each plausible absolute steering wheel angle that does not meet a steering wheel physical range limit threshold value is eliminated as a possibility.

5. The method as claimed in claim 1 wherein the step of calculating an expected output is a yaw rate.

6. The method as claimed in claim 1 wherein the step of calculating an expected output is a roll angle.

7. The method as claimed in claim 1 wherein the step of calculating an expected output is a longitudinal acceleration.

8. The method as claimed in claim 1 wherein the step of calculating an expected output is a lateral acceleration.

9. The method as claimed in claim 1 wherein the step of calculating an expected output is a roll rate.

10. The method as claimed in claim 1 wherein the step of calculating an expected output is a torque.

11. The method as claimed in claim 2 wherein the step of outputting a single absolute steering wheel angle further comprises comparing a calculated expected output to a measured vehicle signal.

12. The method as claimed in claim 11 wherein the calculated expected output is based on the sensed steering wheel angle input, and the vehicle signal is selected from the group consisting of; yaw rate, roll angle, longitudinal acceleration, lateral acceleration, roll rate and torque.

13. The method as claimed in claim 4 further comprising the steps of:
comparing each predetermined offset angle to a predetermined steering wheel physical range limit signal;
determining a steering wheel physical range limit for a minimum threshold determined from a known steering wheel angle sensor output at a first mechanical physical rotation limit of the steering mechanism; and
determining a steering wheel physical range limit for a maximum threshold determined from a known steering wheel angle sensor output at a second mechanical physical rotation limit of the steering mechanism.

14. The method as claimed in claim 5 wherein the step of comparing a calculated expected output further comprises the steps of calculating a yaw rate from the product of a predetermined yaw rate error, a vehicle speed, and the predetermined offset angle.

15. The method as claimed in claim 14 wherein the step of comparing a calculated yaw rate to a vehicle yaw rate for each predetermined offset angle further comprises:
calculating an absolute value of a difference between the calculated yaw rate and a vehicle yaw rate; and
comparing the absolute value of the difference to a threshold value, whereby upon exceeding the threshold value, the plausible steering wheel angles are eliminated as a possibility until one and only one plausible steering wheel angle remains and is output as a determined steering wheel angle.

16. The method as claimed in claim 5 wherein the step of comparing a calculated yaw rate for each predetermined offset angle to a vehicle yaw rate further comprises the step of determining vehicle stability prior to performing the step of comparing a calculated yaw rate.

17. The method as claimed in claim 16 wherein the step of determining vehicle stability further comprises identifying at least one event from the group consisting of:
identifying vehicle travel in a forward direction;
identifying a brake event in a traction control system;
identifying an engine event in a traction control system;
identifying an event in an electronic stability program; and
preventing the determination of a steering wheel angle of a vehicle steering mechanism in the event at least one of the events is occurring.

18. A control module algorithm for determining a steering wheel angle of a vehicle steering mechanism, upon power-up of a vehicle, using a single-turn steering wheel angle sensor, comprising:
a sensed steering wheel angle input to the control module from the single-turn steering wheel angle sensor;
a selected vehicle sensor signal input to the control module;
a vehicle speed input to the control module;
a vehicle stability check input to the control module;
a steering wheel angle lock input;
one or more plausible steering wheel angles at key-on;
a calculated expected output for the selected vehicle sensor signal for each plausible steering wheel angle in the one or more plausible steering wheel angles;
a threshold check of plausible steering wheel angles to the steering wheel angle lock input;
a threshold check of the calculated expected output for each plausible steering wheel angle to an actual selected vehicle sensor signal;
one and only one plausible steering wheel angle output as a result of eliminating plausible steering wheel angles that exceed the threshold checks.

19. The algorithm as claimed in claim 18 wherein the vehicle stability check input further comprises:
a vehicle direction input to the control module; and inputs to the control module from a plurality of vehicle control systems.

20. The algorithm as claimed in claim 19 wherein the inputs from a plurality of vehicle control systems further comprise:
inputs to the control module from a traction control system; and
inputs to the control module from a stability control system.

21. The algorithm as claimed in claim 20 wherein the inputs to the control module from a traction control system further comprise:
a brake event signal; and
an engine event signal.

22. The algorithm as claimed in claim 19 wherein the vehicle direction input is derived from wheel speed sensors.

23. The algorithm as claimed in claim 19 wherein the vehicle has a hybrid system and the vehicle direction input is derived from a motor speed signal of the hybrid system.

24. The algorithm as claimed in claim 18 wherein the steering wheel angle lock input is a threshold level based on minimum and maximum sensor signals known to represent a plausible physical range for the steering wheel mechanism.

25. The algorithm as claimed in claim 18 wherein each plausible steering wheel angles in the one or more plausible steering wheel angles at key-on further comprises an offset added to the steering wheel angle input.

26. The algorithm as claimed in claim 25 wherein the offset is a factor, +n times a predetermined angle, thereby defining an offset steering wheel angle input.

27. The algorithm as claimed in claim 18 wherein the calculated expected output is a yaw rate and further comprises the product of:
a yaw rate error derived from simulation data for a particular vehicle having a steering wheel sensor in a predetermined position;

a vehicle speed; and the offset steering wheel angle input.

28. A method of determining a steering wheel angle of a vehicle steering mechanism, upon power-up of a vehicle, using a single-turn steering wheel angle sensor, the method comprising the steps of:

storing plausible absolute steering wheel angle positions formed from adding offsets of +n times a predetermined angle to a steering wheel angle provided from the single-turn steering wheel angle sensor;

comparing the plausible steering wheel angle positions to predetermined maximum and minimum steering wheel angle threshold values, whereby each plausible absolute steering wheel angle position that exceeds either the maximum or minimum steering wheel angle threshold value is eliminated as a possibility;

determining a vehicle stability check through the identification of at least one item of non-forward motion of the vehicle, a brake event in a traction control system, an engine event in a traction control system or an electronic stability program event;

preventing the determination of a steering wheel angle of a vehicle steering mechanism upon any one of the vehicle stability check items being identified;

calculating a yaw rate for each of the plausible absolute steering wheel angle positions, the calculated yaw rate being a product of a predetermined yaw rate error, a vehicle speed input and the plausible absolute steering wheel angle; and outputting a single steering wheel angle output through a comparison of a difference between the calculated yaw rate and a sensed vehicle yaw rate, whereby each difference that exceeds either a maximum or minimum threshold value is eliminated resulting in the elimination of all but one possibility from the plausible offset steering wheel angle positions.

29. The method as claimed in claim 28 further comprising the step of eliminating possibilities of the plausible steering wheel angle positions through additional comparison of plausible physical range limits for the steering mechanism.

30. The method as claimed in claim 28 further comprising the step of eliminating possibilities of the plausible steering wheel angle positions through additional comparison of plausible torque range limits for the steering mechanism.

31. The method as claimed in claim 28 further comprising the steps of:

eliminating possibilities of the plausible steering wheel angle positions through additional comparison of plausible physical range limits for the steering mechanism; and eliminating possibilities of the plausible steering wheel angle positions through additional comparison of plausible torque range limits for the steering mechanism.

* * * * *